US012660000B2

(12) United States Patent
Löhr et al.

(10) Patent No.: US 12,660,000 B2
(45) Date of Patent: Jun. 16, 2026

(54) SLICE-SPECIFIC RANDOM ACCESS CONFIGURATION

(71) Applicant: Lenovo (Singapore) Pte. Ltd., New Tech Park (SG)

(72) Inventors: Joachim Löhr, Wiesbaden (DE); Hyung-Nam Choi, Ottobrunn (DE); Prateek Basu Mallick, Dreieich (DE); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 341 days.

(21) Appl. No.: 18/261,244

(22) PCT Filed: Jan. 14, 2022

(86) PCT No.: PCT/IB2022/050307
§ 371 (c)(1),
(2) Date: Jul. 12, 2023

(87) PCT Pub. No.: WO2022/153242
PCT Pub. Date: Jul. 21, 2022

(65) Prior Publication Data
US 2024/0064817 A1 Feb. 22, 2024

Related U.S. Application Data

(60) Provisional application No. 63/137,614, filed on Jan. 14, 2021.

(51) Int. Cl.
*H04W 74/0833* (2024.01)
*H04W 74/0836* (2024.01)
*H04W 74/0838* (2024.01)

(52) U.S. Cl.
CPC .... *H04W 74/0833* (2013.01); *H04W 74/0836* (2024.01); *H04W 74/0838* (2024.01)

(58) Field of Classification Search
CPC ........... H04W 74/006; H04W 74/0838; H04W 74/0836; H04W 72/12; H04W 72/04; H04W 74/08; H04W 8/22
See application file for complete search history.

(56) References Cited

U.S. PATENT DOCUMENTS

2017/0367120 A1    12/2017   Murray et al.
2019/0261185 A1     8/2019   Velev
(Continued)

OTHER PUBLICATIONS

PCT/IB2022/050307, "Notification of Transmittal of the International Search Report and the Written Opinion of the International Searching Authority, or the Declaration", International Searching Authority, Apr. 13, 2022, pp. 1-15.
(Continued)

*Primary Examiner* — Marcus Smith
*Assistant Examiner* — Francesca Lima Santos
(74) *Attorney, Agent, or Firm* — Kunzler Needham Hilton

(57) ABSTRACT

Apparatuses, methods, and systems are disclosed for slice-specific RACH configuration. One apparatus (1000) includes a processor (1005) and a transceiver (1025) that receives (1205) a first set of slice-specific RACH configurations and receives (1210) a mapping of slice group identities to network slices of a communication network. Here, each slice-specific RACH configuration contains a set of random access parameters specific to a slice group identity. The processor (1005) selects (1215) a first RACH configuration for a first network slice based on the mapping and performs (1220) a random-access procedure in accordance with the first RACH configuration. Via the transceiver (1025), the processor (1005) transmits (1225) a service request to the communication network in accordance with the first RACH configuration.

15 Claims, 12 Drawing Sheets

(56) References Cited

U.S. PATENT DOCUMENTS

2020/0022038  A1      1/2020  Han et al.
2023/0328794  A1*  10/2023  Cheng .............. H04W 74/0833
370/329

OTHER PUBLICATIONS

CMCC, "Revised SID: Study on enhancement of RAN Slicing for NR", 3GPP TSG RAN Meeting #89e RP-201612, Sep. 14-18, 2020, pp. 1-4.
3GPP, "3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.
3GPP, "3rd Generation Partnership Project; Technical Specification Group Services and System Aspects; Procedures for the 5G System (5GS); Stage 2 (Release 16)", 3GPP TS 23.502 V16.7.0, Dec. 2020, pp. 1-603.
3GPP, "3rd Generation Partnership Project; Technical Specification Group Core Network and Terminals; Non-Access-Stratum (NAS) protocol for 5G System (5GS); Stage 3; (Release 17)", 3GPP TS 24.501 V17.1.0, Dec. 2020, pp. 1-745.
3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.
3GPP, "3rd Generation Partnership Project; Technical Specification Group Radio Access Network; NG-RAN; NG Application Protocol (NGAP) (Release 16)", 3GPP TS 38.413 V16.3.0, Sep. 2020, pp. 1-466.

* cited by examiner

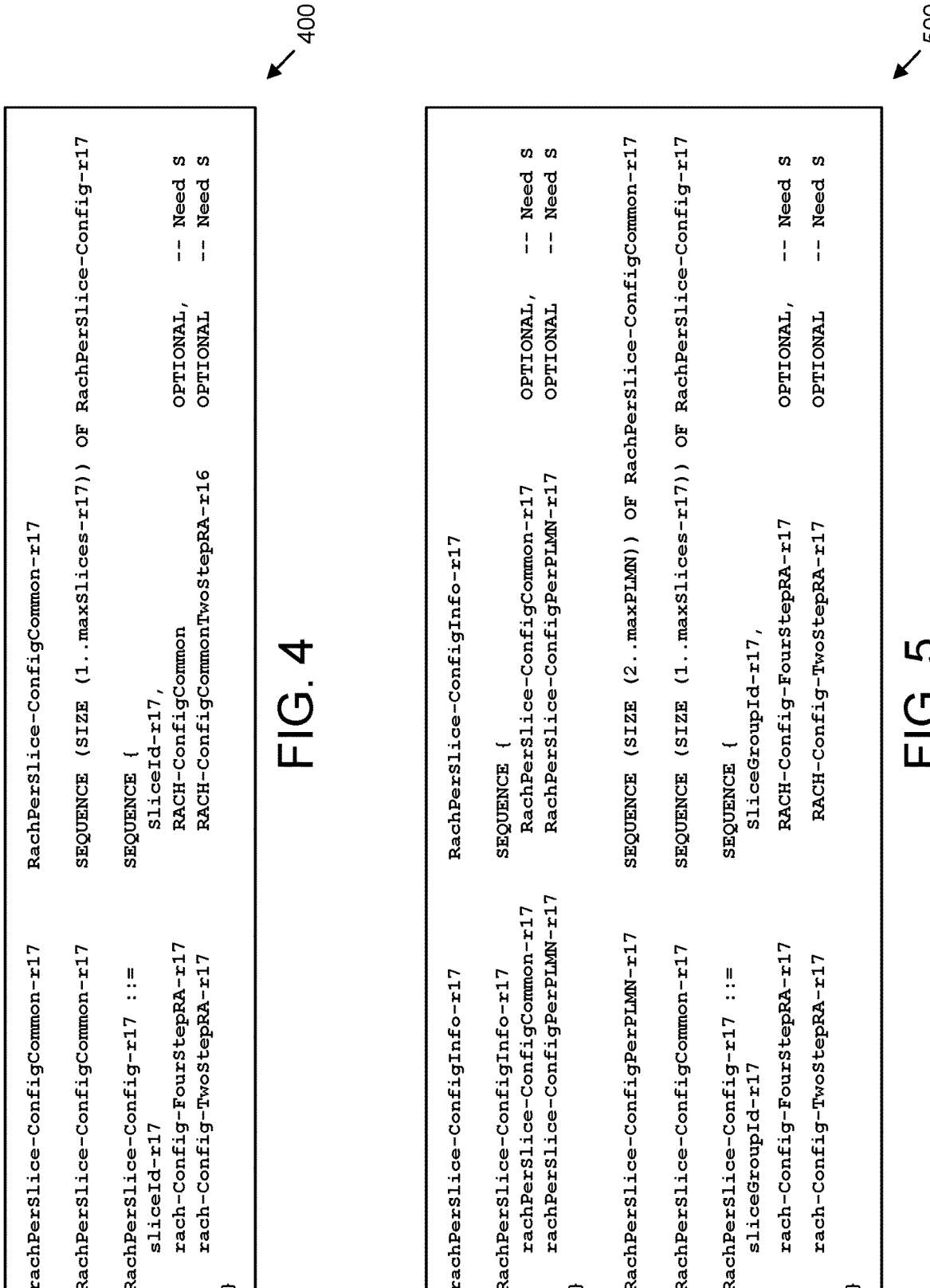

```
rachPerSlice-ConfigCommon-r17          RachPerSlice-ConfigCommon-r17

RachPerSlice-ConfigCommon-r17          SEQUENCE (SIZE (1..maxSlices-r17)) OF RachPerSlice-Config-r17

RachPerSlice-Config-r17 ::=            SEQUENCE {
    sliceId-r17                            SliceId-r17,
    rach-Config-FourStepRA-r17             RACH-ConfigCommon                    OPTIONAL,    -- Need s
    rach-Config-TwoStepRA-r17              RACH-ConfigCommonTwoStepRA-r16        OPTIONAL     -- Need s
}
```

FIG. 4

```
rachPerSlice-ConfigIgInfo-r17          RachPerSlice-ConfigIgInfo-r17

RachPerSlice-ConfigIgInfo-r17          SEQUENCE {
    rachPerSlice-ConfigCommon-r17          RachPerSlice-ConfigCommon-r17       OPTIONAL,    -- Need s
    rachPerSlice-ConfigPerPLMN-r17         RachPerSlice-ConfigPerPLMN-r17       OPTIONAL     -- Need s
}

RachPerSlice-ConfigPerPLMN-r17         SEQUENCE (SIZE (2..maxPLMN)) OF RachPerSlice-ConfigCommon-r17

RachPerSlice-ConfigCommon-r17          SEQUENCE (SIZE (1..maxSlices-r17)) OF RachPerSlice-Config-r17

RachPerSlice-Config-r17 ::=            SEQUENCE {
    sliceGroupId-r17                       SliceGroupId-r17,
    rach-Config-FourStepRA-r17             RACH-Config-FourStepRA-r17           OPTIONAL,    -- Need s
    rach-Config-TwoStepRA-r17              RACH-Config-TwoStepRA-r17            OPTIONAL     -- Need s
}
```

FIG. 5

```
ra-PrioritizationPerSlice-ConfigInfo-r17         RA-PrioritizationPerSlice-ConfigInfo-r17

RA-PrioritizationPerSlice-ConfigInfo-r17    SEQUENCE {
    ra-PrioritizationPerSlice-ConfigCommon-r17     RA-PrioritizationPerSlice-ConfigCommon-r17
OPTIONAL,    -- Need R
    ra-PrioritizationPerSlice-ConfigPerPLMN-r17       RA-PrioritizationPerSlice-ConfigPerPLMN-r17
OPTIONAL    -- Need R
} ra-PrioritizationPerSlice-ConfigPerPLMN-r17      SEQUENCE (SIZE (2..maxPLMN)) OF RA-PrioritizationPerSlice-
ConfigCommon-r17

RA-PrioritizationPerSlice-ConfigCommon-r17       SEQUENCE (SIZE (1..maxSlices-r17)) OF RA-
PrioritizationPerSlice-Config-r17

RA-PrioritizationPerSlice-Config-r17 ::=         SEQUENCE {
    sliceGroupId-r17                                 sliceGroupId-r17,
    ra-PrioritizationConfig-r17                      RA-Prioritization
}

RA-Prioritization ::=             SEQUENCE {
    powerRampingStepHighPriority      ENUMERATED {dB0, dB2, dB4, dB6},
    scalingFactorBI                   ENUMERATED {zero, dot25, dot5, dot75}      OPTIONAL,      -- Need R
    ...
}
```

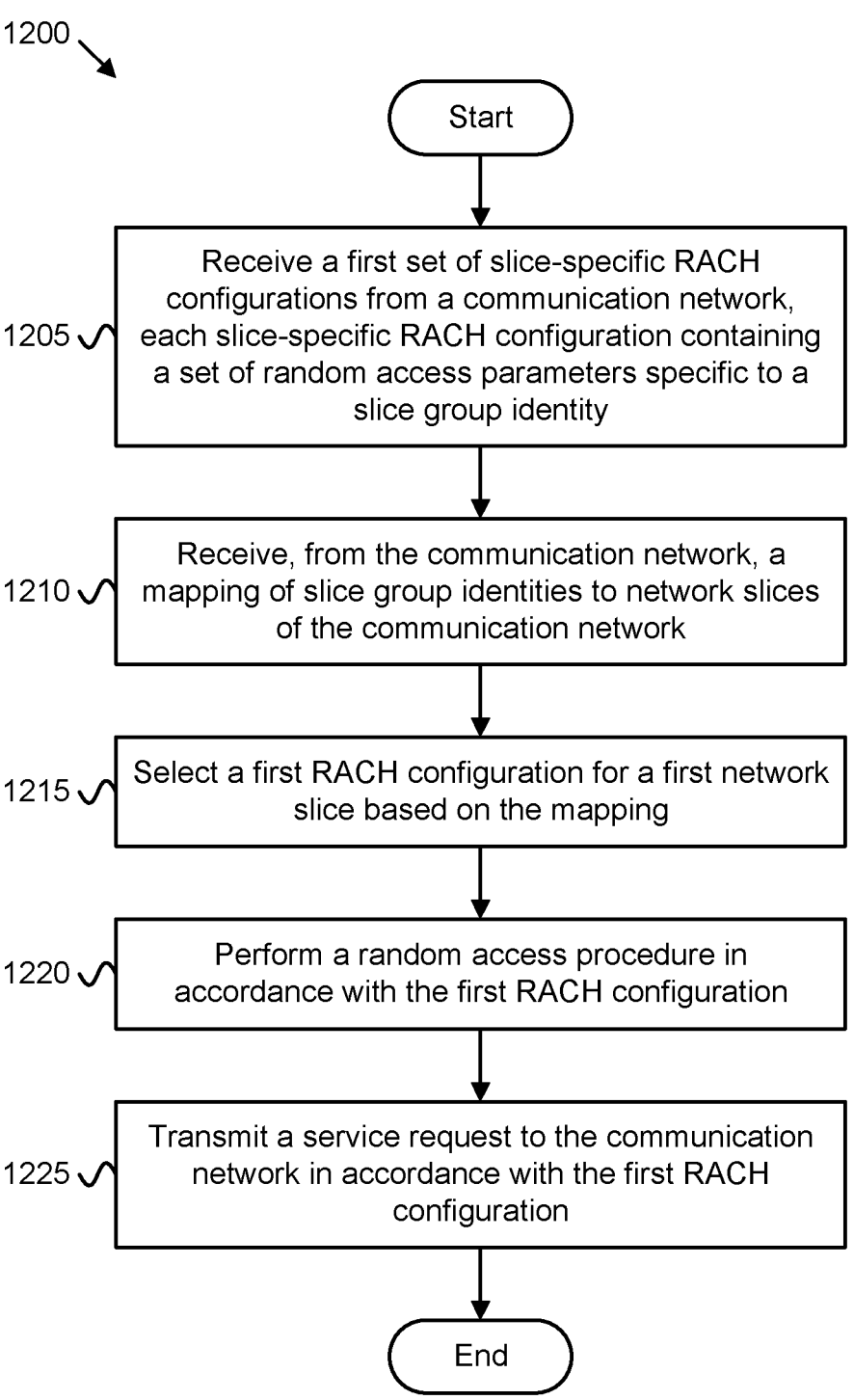

Start

1205 — Receive a first set of slice-specific RACH configurations from a communication network, each slice-specific RACH configuration containing a set of random access parameters specific to a slice group identity 1210 — Receive, from the communication network, a mapping of slice group identities to network slices of the communication network 1215 — Select a first RACH configuration for a first network slice based on the mapping 1220 — Perform a random access procedure in accordance with the first RACH configuration 1225 — Transmit a service request to the communication network in accordance with the first RACH configuration End

FIG. 12

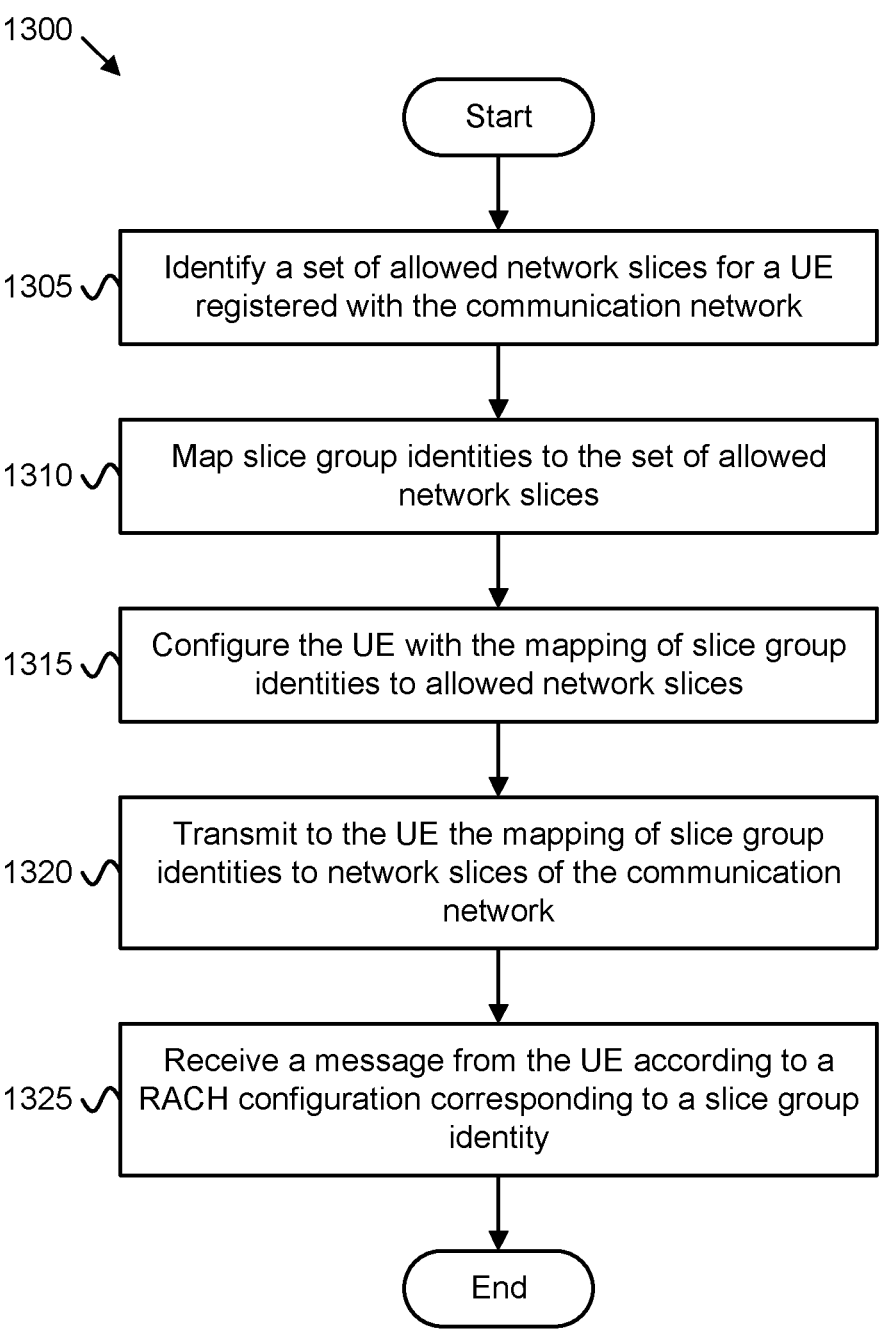

1300

Start

1305 — Identify a set of allowed network slices for a UE registered with the communication network 1310 — Map slice group identities to the set of allowed network slices 1315 — Configure the UE with the mapping of slice group identities to allowed network slices 1320 — Transmit to the UE the mapping of slice group identities to network slices of the communication network 1325 — Receive a message from the UE according to a RACH configuration corresponding to a slice group identity

End

FIG. 13

SLICE-SPECIFIC RANDOM ACCESS CONFIGURATION

CROSS-REFERENCE TO RELATED APPLICATIONS

This application claims priority to U.S. Provisional Patent Application No. 63/137,614 entitled "SLICE-SPECIFIC RACH CONFIGURATION FOR NR" and filed on Jan. 14, 2021 for Joachim Lohr, Hyung-Nam Choi, Prateek Basu Mallick, and Genadi Velev, which application is incorporated herein by reference.

FIELD

The subject matter disclosed herein relates generally to wireless communications and more particularly relates to network slice-specific enhancements to the Random access procedure (i.e., "RA procedure" or "RACH procedure") including Random-access resource partitioning and Random-access prioritization.

BACKGROUND

In certain wireless communication systems, network slicing enables network operators to optimize implementation of tailor-made functionality and network operation specific to the needs of a market segment.

BRIEF SUMMARY

Disclosed are procedures for slice-specific RACH configuration. Said procedures may be implemented by apparatus, systems, methods, or computer program products.

One method of a user equipment ("UE") for slice-specific RACH configuration includes receiving, from a communication network, a first set of slice-specific random access channel ("RACH") configurations, each slice-specific RACH configuration containing a set of random access parameters specific to a slice group identity. The method includes receiving, from the communication network, a mapping of slice group identities to network slices of the communication network and selecting, based on the mapping, a first RACH configuration for a first network slice. The method includes performing a random-access procedure in accordance with the first RACH configuration and transmitting a service request to the communication network in accordance with the first RACH configuration. As used herein, the terms "RA procedure" and "RACH procedure" both refer to the random-access procedure and may be used interchangeably.

One method of a network device for slice-specific RACH configuration includes identifying a set of allowed network slices for a UE registered with the communication network and mapping slice group identities to the set of allowed network slices. The second method includes configuring the UE with the mapping of slice group identities to allowed network slices and transmitting to the UE the mapping of slice group identities to network slices of the communication network. The second method includes receiving a message from the UE according to a RACH configuration corresponding to a slice group identity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a diagram illustrating one embodiment of Abstract Syntax Notation 1 ("ASN.1") signaling for separate slice-specific RACH configurations in time and/or frequency;

FIG. 5 is a diagram illustrating one embodiment of ASN.1 signaling for slice-specific RACH configuration for random access resource partitioning;

FIG. 6 is a diagram illustrating one embodiment of ASN.1 signaling for slice-specific RACH configurations for RA prioritization;

FIG. 12 is a flowchart diagram illustrating one embodiment of a first method for slice-specific RACH configuration; and FIG. 13 is a flowchart diagram illustrating one embodiment of a second method for slice-specific RACH configuration.

DETAILED DESCRIPTION

Figure 1:
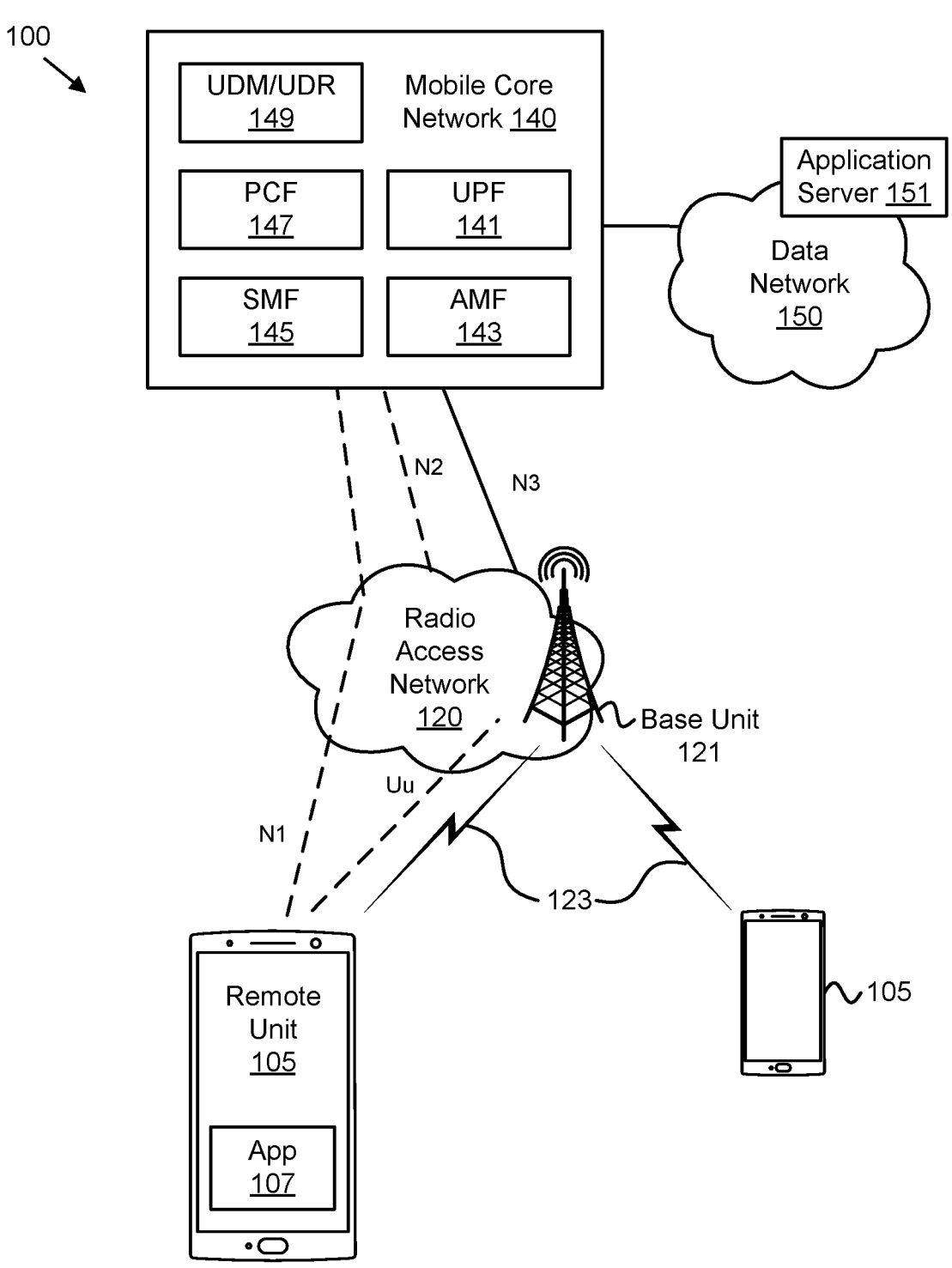
FIG. 1 is a block diagram illustrating one embodiment of a wireless communication system for slice-specific RACH configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for Slice-specific RACH configuration for NR. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

According to 3GPP NR Rel-15 specifications the initial access to a cell using the contention-based random access ("CBRA") procedure is carried out by UE without any slice awareness, i.e., the Random Access Channel ("RACH") configuration for CBRA procedure is cell-specific and applies to all network slices which are supported in the cell. Moreover, 3GPP NR Rel-15 does not support Random-Access ("RA") resource partitioning for network slices due to the fact that large number of slices (e.g., hundreds of slices) may need to be supported in a network. To allow prioritized access during the CBRA procedure, RA prioritization can be configured for certain devices based on subscription type or subscribed services. In this case the network can configure for Access Identity 1 (e.g., UE configured for Multimedia Priority Service ("MPS")) and/or Access Identity 2 (e.g., UE configured for Mission Critical Service ("MCS")) dedicated parameters for power ramping step and scaling factor for the backoff indicator ("BI").

Disclosed are solutions for slice-specific RACH configuration. A first solution relates to implicit signaling of slice-specific RACH configuration. In some embodiments, a slice-specific RACH configuration (e.g., for random access resource partitioning and prioritization) is signaled in a System Information Block ("SIB") using an implicit approach and per Public Land Mobile Network ("PLMN") to support Radio Access Network ("RAN") sharing. Said slice-specific RACH configuration may be signaled in an existing SIB or a new SIB. In one embodiment, the UE uses this slice-specific RACH configuration in the initial uplink bandwidth part ("UL BWP"). In another embodiment, the UE uses another UL BWP if a separate UL BWP shall be used for slice-specific random access.

In some embodiments, the network defines a "slice group identity" for a network slice and the slice group identify is used to implicitly signal a slice-specific RACH configuration. In one embodiment, the new identifier is allocated based on the allowed slices from the UE's context, e.g., allowed S-NSSAI values provided by CN. In certain embodiments, the allocation of allowed S-NSSAI to "Slice group identity" values is left to RAN node configuration or implementation. For example, the RAN node may allocate a "Slice group identity" to an allowed S-NSSAI only when the initial access to the corresponding slice shall be prioritized during Contention-Based Random-Access ("CBRA") procedure.

In some embodiments, the UE may be configured with a mapping of a "Slice group identity" to an allowed S-NSSAI value in a Radio Resource Control ("RRC") message, e.g., an RRC release message. In certain embodiments, the mapping of "Slice group identity" is configured only after activation of Access Stratum ("AS") security. In one embodiment, a configured mapping of a "Slice group identity" to an allowed S-NSSAI value is valid for all PLMNs. In another embodiment, a configured mapping of a "Slice group identity" to an allowed S-NSSAI value is valid per PLMN sharing the RAN. The UE uses the received "Slice group identity" value(s) for initial access from RRC_IDLE or RRC_INACTIVE using CBRA resources. The UE selects the RACH configuration that matches with the specific slice it wants to access.

A second solution relates to configuration for slice-specific RA resource partitioning. In one embodiment, each RACH configuration per slice shares the same resources in frequency domain. In another embodiment, for each frequency resource the RACH configuration in time per slice may be different, i.e., in one frequency resource the number of RACH occasions can be lower/higher compared to the other frequency resources. In certain embodiments, in time domain each RACH configuration per slice is separate from each other, i.e., the PRACH preambles and RACH occasions are not shared between the slices.

A third solution relates to an alternative configuration for slice-specific RA resource partitioning Here, each RACH configuration per slice shares the same resources in time/frequency, i.e., the configuration in time/frequency is same for all slices. To allocate RA resources per slice in time/frequency the following parameters are configured per slice: RACH period, RO start index, RO offset in time/frequency. Within each RO a number of preambles are allocated per slice given by a "Preamble start index" and a "Preamble end index."

FIG. 1 depicts a wireless communication system 100 for slice-specific RACH configuration, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for slice-specific RACH configuration apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for slice-specific RACH configuration.

As noted above, a Network slice is a logical network that provides specific network capabilities and network characteristics. In various embodiments, the network slice consists of a Radio Access Network ("RAN") part and a Core Network ("CN") part. While the network can support large number of slices (hundreds), the UE need not support more than 8 slices simultaneously. Note that traffic for different slices is handled by different PDU sessions.

An S-NSSAI uniquely identifies a network slice and is comprised of a Slice/Service type and a Slice Differentiator. The Slice/Service type ("SST"), which refers to the expected network slice behavior in terms of features and services. The SST field is of length 8 bits and may have standardized and non-standardized values: values 0 to 127 belong to the standardized SST range and are defined in 3GPP Technical Specification ("TS") 23.501, and values 128 to 255 belong to the Operator-specific range. The Slice Differentiator ("SD") is optional information that complements the Slice/Service type(s) to differentiate between multiple network slices of the same SST value. For instance, for an SST of value eMBB, multiple SDs may be defined such as "Company X eMBB slice," "Company Y eMBB slice" etc. The SD field is of length 24 bits.

The UE subscription data in the UDM/UDR 149 stores a list of Subscribed S-NSSAI(s), which a UE is subscribed to use in a PLMN (in a home or visited PLMN). A UE may be configured by the network with the following network slice configuration: Allowed NSSAI; Configured NSSAI.

The Allowed NSSAI is a list of S-NSSAIs provided by the serving PLMN during e.g., a Registration procedure, indicating the S-NSSAIs values the UE could use in the serving PLMN for the current Registration Area. The Allowed NSSAI is derived by network from the Subscribed S-NSSAI and taking into account the S-NSSAIs which are valid for the current registration area and Access Type provided by the AMF the UE has registered with. The Allowed NSSAI is used by the UE, e.g., to create Information Element ("IE") "Requested NSSAI" in the NAS registration request message and to establish PDU Sessions in the current registration area.

The Configured NSSAI is a list of S-NSSAIs applicable to one or more PLMNs; derived by network from the Subscribed S-NSSAI. The Configured NSSAI is used by UE if there are no allowed S-NSSAI(s) for the current PLMN. The Configured NSSAI contains only S-NSSAI values from the serving PLMN (can be the home PLMN or a visited PLMN). The Configured NSSAI is obtained from the AMF upon successful completion of a UE's Registration procedure over an Access Type or as part of UE network slice configuration update procedure. The Configured NSSAI is used by the UE, e.g., to create IE "Requested NSSAI" in the NAS registration request message.

In 3GPP Rel-17, enhancements were made to the network slicing feature to make it more flexible to support services and specific deployment scenarios. One enhancement includes enabling the UE fast access to the cell supporting the intended slice, including: a) Slice based cell reselection under network control; and b) Slice based RACH configuration or access barring. To resolve the above described issues, solutions are described that enhance CBRA procedure to enable UE fast access to a specific slice that is supported by the cell.

Figure 2A:
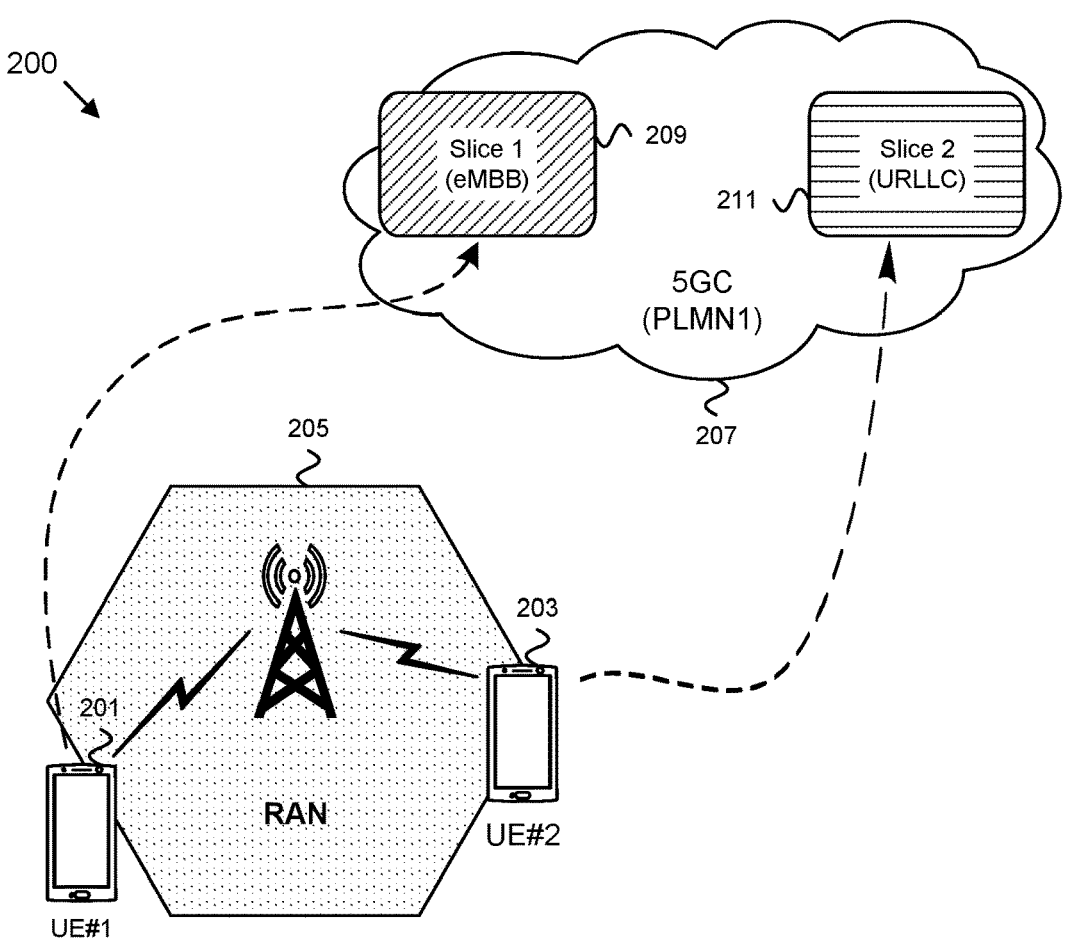
FIG. 2A is a diagram illustrating one embodiment of a scenario for fast access to a specific slice for RRC_IDLE/RRC_INACTIVE UEs.

FIG. 2A shows an exemplary scenario 200 for fast access to a specific slice, according to embodiments of the disclosure. Here, a first UE (denoted "UE #1") 201 and a second UE (denoted "UE #2") 203 are within coverage of the RAN 205. Here, it is assumed that the UEs 201, 203 are both in the RRC_IDLE or RRC_INACTIVE states. Each UE 201, 203 has a configuration for RACH resources in the RAN 205 to initiate a RACH procedure, e.g., for Non-Access Stratum ("NAS") registration, NAS service request or resuming of RRC connection with the 5GC 207 (e.g., of a first PLMN). In various embodiments, the RACH configuration is broadcast by the RAN 205 in one or more System Information Blocks ("SIBs").

In the depicted scenario 200, the first UE 201 wants to access to a first slice (denoted Slice #1) 209, i.e., corresponding to S-NSSAI #1. Further, the second UE 203 wants to access to a second network slice (denoted "Slice #2") 211, i.e., corresponding to S-NSSAI #2. In case the network (i.e., PLMN #1) wants to prioritize the random access channel ("RACH") to the second network slice 211 over random access to the first network slice 209, then the network can configure slice-specific CBRA resources in the cell accordingly, e.g., allocate more RACH resources to the second network slice 211 compared to the RACH resources allocated to the first network slice 209. Alternatively, in case where common CBRA resources are configured for both slices, then the network may configure RA prioritization parameters specific to the second network slice 211, i.e., configure dedicated parameters for power ramping step and scaling factor for the backoff indicator ("BI") for the second network slice 211. Note that the RAN 205 may be shared among additional PLMNs, as discussed below with reference to FIG. 2B.

Figure 2B:
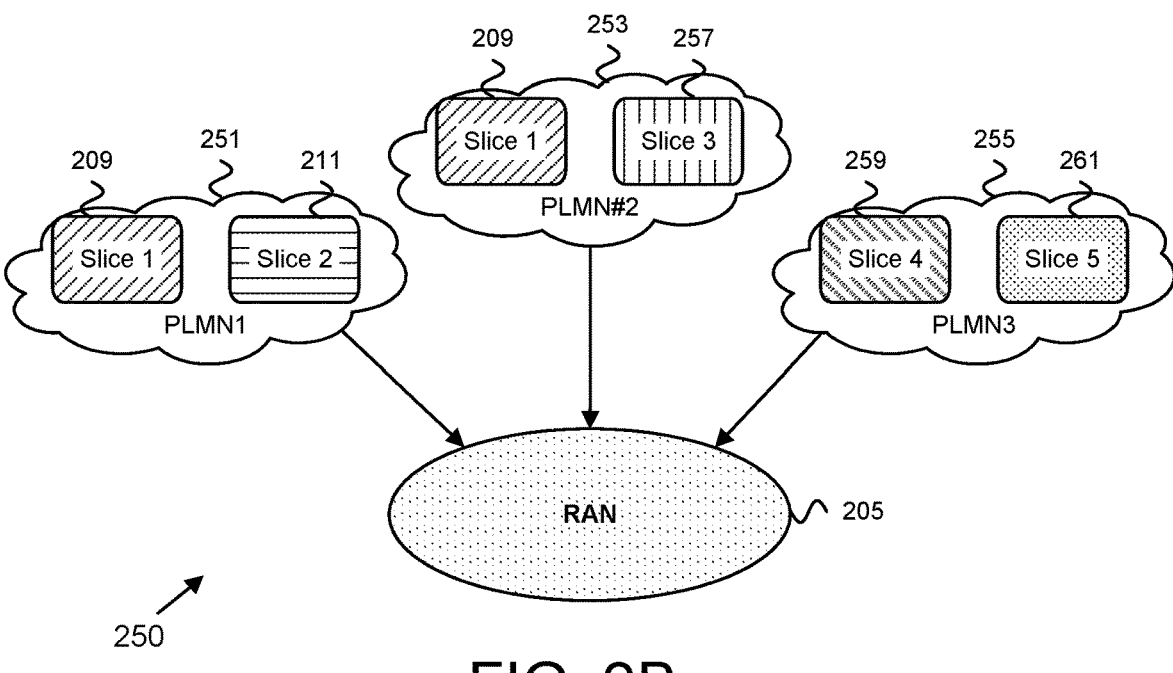
FIG. 2B is a diagram illustrating one embodiment of a RAN sharing scenario for PLMN-specific slice configuration.

FIG. 2B is a diagram illustrating one embodiment of a RAN sharing scenario 250 for PLMN-specific slice configuration. As depicted, the RAN 205 may be shared among at least three PLMNs, depicted here as a first PLMN (denoted PLMN #1) 251, a second PLMN (denoted PLMN #2) 253, and a third PLMN (denoted PLMN #3) 255. In the depicted example, the first PLMN 251 supports a pair of network slices, here, the first network slice 209 and the second network slice 211. The second PLMN 253 supports the first network slice 209 and also supports a third network slice (denoted "Slice #3") 257, i.e., corresponding to S-NSSAI #3. The third PLMN 255 supports a fourth network slice (denoted "Slice #4") 259, i.e., corresponding to S-NSSAI #4, and further supports a fifth network slice (denoted "Slice #5") 261.

Each of the first PLMN 251, the second PLMN 253 and the third PLMN 255 can be accessed by a UE (e.g., first UE 201 and/or second UE 203) via the RAN 205. In various embodiments, the RAN 205 is configured with slice-specific RACH resources for each supported RACH, as described in greater detail below.

Figure 3:
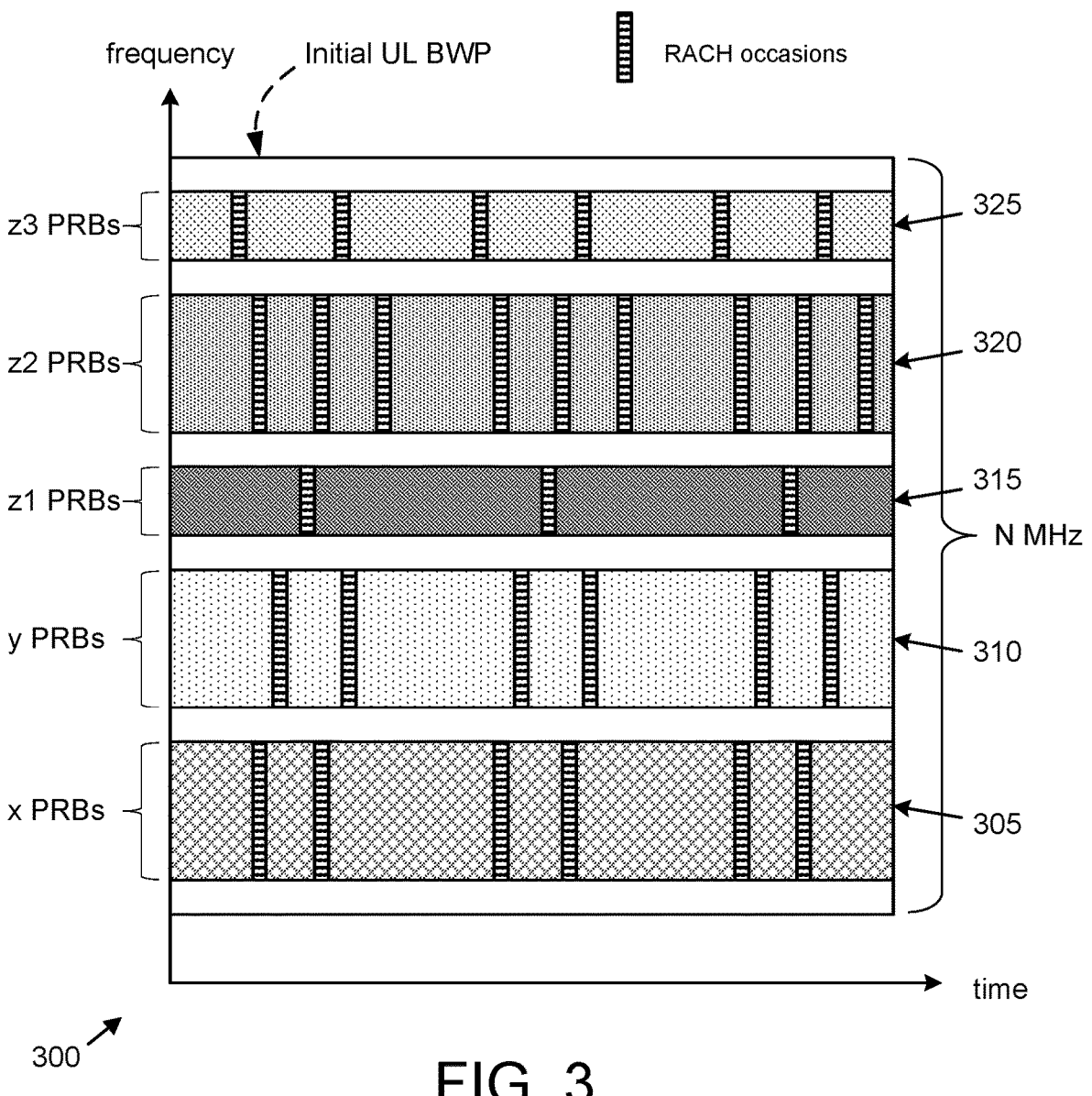
FIG. 3 is a diagram illustrating one embodiment of separate slice-specific RACH configurations in time and/or frequency.

FIG. 3 depicts a time/frequency diagram 300 for slice-specific RACH configuration assuming five separate RA resources in frequency domain (for 4-step RA, 2-step RA, slice 1, slice v, slice w). In the depicted embodiment, 'x' number of Physical Resource Blocks ("PRBs") are configured for 4-step RACH procedure (see frequency resources 305), 'y' number of PRBs are configured for 2-step RACH procedure (see frequency resources 310), 'z1' number of PRBs are configured for fast access RACH for slice '1' (see frequency resources 315), 'z2' number of PRBs are configured for fast access RACH for slice 'v' (see frequency resources 320), 'z3' number of PRBs are configured for fast access RACH for slice 'w' (see frequency resources 325).

FIG. 4 depicts an exemplary Abstract Syntax Notation 1 ("ASN.1") IE 400 of signaling for separate slice-specific RACH configurations in time and frequency, e.g., which do not overlap with each other in frequency. In some embodiments, the separate slice-specific RACH configurations may be signaled for the initial UL bandwidth part ("BWP") in SIB1 or new SIB (rachPerSlice-ConfigCommon-r17). Maximum number of slices (maxSlices-r17) may be e.g., 4, 8, 16, and the RACH configuration per slice (IE RachPerSlice-Config-r17) includes a slice identity (sliceId-r17) and RACH configuration for either 4-step or 2-step CBRA (rach-Config-FourStepRA-r17, rach-Config-TwoStepRA-r17). For the slice identity the S-NSSAI values or SST values may be used.

However, depending on the number of slice configurations a large size of initial UL BWP may be required what may not be possible in certain deployments where the cell's channel bandwidth is limited. Additionally, disclosing slice information per S-NSSAI value in cleartext per broadcast SIB may result in potential security issues. Further, grouping of RACH configuration per SST value may not be appropriate either due to the fact that slice configurations of same SST value may differ across PLMNs and within PLMNs as well.

As an alternative to configuring separate slice-specific RA resources in time/frequency, slice-specific RA resources may be shared with the legacy 4-step or 2-step CBRA resources in time/frequency. In this case the network has to apply proper RA resource partitioning with regards to the preambles and RACH occasions between the legacy and the slice-specific CBRA resources. The advantage of this solution is that no increase of initial UL BWP size may be required. On the other hand, it may negatively impact the UEs not supporting the slice-specific CBRA enhancements as the RA resources for those UEs may be significantly reduced depending on the number of slice configurations. This could result in higher random access collision probability and thus longer latency in accessing the network for those UEs. And further drawbacks may result from signaling of the slice-specific RA resources using S-NSSAI or SST values.

In order to realize slice-specific RACH configuration the following enhancements to CBRA procedure with regards to RA resource partitioning and prioritization are described:

Enhancement 1: Implicit signaling of slice-specific RACH configuration. Slice-specific RACH configuration (for RA resource partitioning and prioritization) is signaled in SIB (in an existing SIB or a new SIB) using an implicit approach and per PLMN to support RAN sharing. The UE uses this slice-specific RACH configuration in the initial UL BWP or another UL BWP if a separate UL BWP shall be used for slice-specific random access. For the latter case, the separate UL BWP identity may be signaled by the RAN node in SIB1 as part of e.g., IE BWP-UplinkCommon.

A new "Slice group identity" is defined for this implicit signaling. This new identifier is allocated by RAN node based on the allowed slices from the UE's context, e.g., allowed S-NSSAI values provided by CN. For instance, upon successful activation of the NAS connection, i.e., transition from CM-Idle to CM-Connected state, the AMF sends the UE context to the RAN including the list of allowed slices (the concerned messages are specified in 3GPP TS 24.501).

The allocation of allowed S-NSSAI to "Slice group identity" values is left to RAN node configuration or implementation, i.e., it allocates a "Slice group identity" to an allowed S-NSSAI only when the initial access to the corresponding slice shall be prioritized during CBRA procedure.

The RAN node may configure a mapping of a "Slice group identity" to an allowed S-NSSAI value to the UE in an RRC message, e.g., the RRC release message, only after activation of AS security. The mapping of a "Slice group identity" to an allowed S-NSSAI value may be valid for all PLMNs or valid per PLMN sharing the RAN.

The UE uses the received "Slice group identity" value(s) for initial access from RRC_IDLE or RRC_INACTIVE using CBRA resources. The UE selects the RACH configuration that matches with the specific slice it wants to access to. The length of the "Slice group identity" may be 8 bits (with value range from 0 to 255). The maximum number of slice-specific RACH configurations may be limited to e.g., 2, 4, 8 or 16.

Enhancement 2: Configuration for slice-specific RA resource partitioning. Each RACH configuration per slice shares the same resources in frequency domain, i.e., the parameters "msg1-FDM" (number of frequency resources) and "msg1-FrequencyStart" (location) are same for each slice. But for each frequency resource the RACH configuration in time per slice may be different, i.e., in one frequency resource the number of RACH occasions can be lower/higher compared to the other frequency resources.

In time domain each RACH configuration per slice is separate from each other, i.e., the PRACH preambles and RACH occasions are not shared between the slices. All slice-specific RACH configurations are separate from legacy RA resources (4-step and/or 2-step RA) in time/frequency.

Enhancement 3: Alternative configuration for slice-specific RA resource partitioning. Each RACH configuration per slice shares the same resources in time/frequency, i.e., the configuration in time/frequency is same for all slices. To allocate RA resources per slice in time/frequency the following parameters are configured per slice:

RACH period: its length may be 1 or multiple radio frames

RO start index: based on the available ROs within the configured RACH period

RO offset in time/frequency: offset relative to the ROs within the configured RACH period; a value "0" means no offset, a value "1" in time means the next available RO in time shall be omitted, a value "1" in frequency means the next available RO in the adjacent frequency resource shall be taken, and so on.

Within each RO a number of preambles are allocated per slice given by a "Preamble start index" and a "Preamble end index."

All slice-specific RACH configurations are separate from legacy RA resources (4-step and/or 2-step RA) in time/frequency.

Although the following enhancements and embodiments focus on NR RAT connected to 5GC, the enhancements and embodiments are also applicable to Evolved Universal Terrestrial Radio Access ("E-UTRA") RAT connected to 5GC.

FIG. 5 shows an exemplary ASN.1 IE 500 of signaling for slice-specific RACH configurations for RA resource partitioning in time/frequency in an existing SIB (e.g., SIB1) or new SIB using the field rachPerSlice-ConfigInfo-r17. In case of SIB1, the field rachPerSlice-ConfigInfo-r17 is configured along with the associated UL BWP information as part of IE BWP-UplinkCommon. The maximum number of slice-specific configurations is given by maxSlices-r17.

To support RAN sharing, the slice-specific configurations may be common to all PLMNs sharing the RAN (given by rachPerSlice-ConfigCommon-r17) or specific per PLMN (given by rachPerSlice-ConfigPerPLMN-r17). The maximum number of PLMNs is given by maxPLMN and may have a value of up to 12. Each configuration per slice (IE RachPerSlice-Config-r17) includes a Slice group identity (sliceGroupId-r17) and configuration for either 4-step or 2-step CBRA (rach-Config-FourStepRA-r17, rach-Config-TwoStepRA-r17).

FIG. 6 shows an exemplary ASN.1 IE 600 of signaling for slice-specific RACH configurations for RA prioritization in the existing SIB1. The field ra-PrioritizationPerSlice-ConfigInfo-r17 is included in IE RACH-ConfigCommon (for 4-step CBRA) and/or IE RACH-ConfigCommonTwoStepRA-r16 (for 2-step CBRA). The maximum number of slice-specific configurations is given by maxSlices-r17.

To support RAN sharing the slice-specific configurations may be common to all PLMNs sharing the RAN (given by ra-PrioritizationPerSlice-ConfigCommon-r17) or specific per PLMN (given by ra-PrioritizationPerSlice-ConfigPerPLMN-r17). The maximum number of PLMNs is 12 and given by parameter maxPLMN. Each configuration per slice (IE RA-PrioritizationPerSlice-Config-r17) includes a Slice group identity (sliceGroupId-r17) and configuration for RA prioritization (ra-PrioritizationConfig-r17) containing dedicated parameters for power ramping step and scaling factor for the backoff indicator ("BI").

Figure 7:
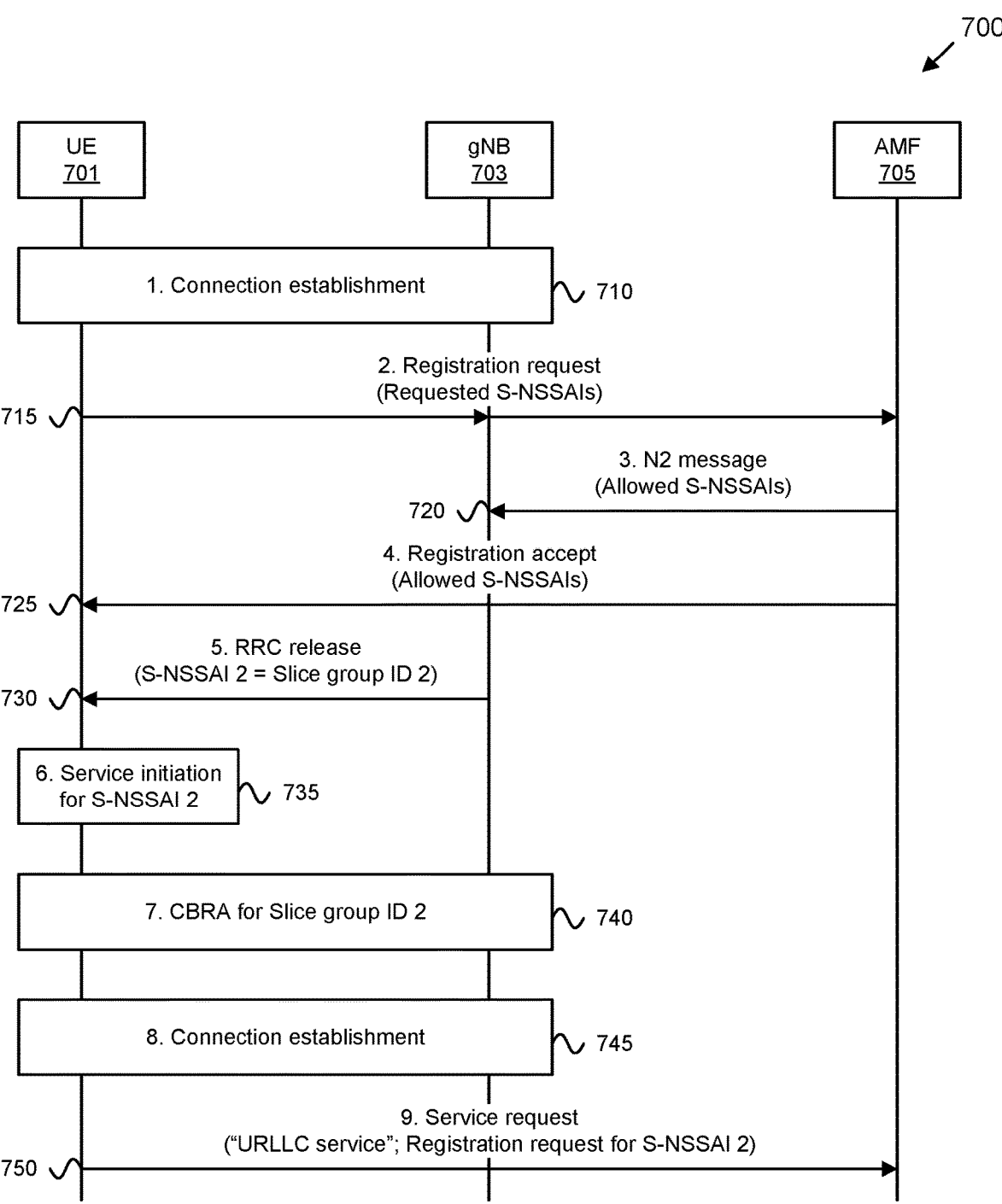
FIG. 7 is a call-flow diagram illustrating one embodiment of allocation of Slice group identity value.

FIG. 7 is a call-flow diagram illustrating a procedure 700 for allocating slice group identity value, according to embodiments of the disclosure. The procedure 700 involves a UE 701 (i.e., one embodiment of the remote unit 105, the UE #1 201, and/or the UE #2 203), a gNB 703 (i.e., one embodiment of the base unit 121), and an AMF 705 (i.e., one embodiment of the AMF 143). The procedure 700 includes the following steps:

At Step 1, an RRC connection is established between the UE 701 and the gNB 703 (see block 710). For the initial access, the UE 701 used common CBRA resources for 4-step or 2-step RA configured in the cell since Slice group identities have not been configured yet in the UE.

Step 2, the UE 701 sends the NAS Registration request message to AMF 705 including the requested S-NSSAI #1, S-NSSAI #2 (see messaging 715).

Step 3, after successful UE 701 authentication, the AMF 705 retrieves the UE 701 subscription information from the UDM/UDR (or from an old AMF), where the subscription information contains the S-NSSAI #1 and S-NSSAI #2 as subscribed S-NSSAIs. The AMF 705 determines that both S-NSSAIs are supported by the current UE's serving cell or Tracking Area Identity ("TAI", i.e., PLMN ID+Tracking Area Code). As result, the AMF 705 sends the information about the allowed S-NSSAI #1, S-NSSAI #2 to the gNB 703 over an N2 message (e.g., N2 DOWNLINK NAS TRANSPORT as specified in 3GPP TS 38.413) (see messaging 720).

Step 4, the AMF 705 sends the Registration accept message to the UE 701 with the same information for allowed S-NSSAIs, as in step 3 (see messaging 725).

Step 5, after activation of AS security, the gNB 703 sends the RRC release message to the UE 701 only including the mapping of "Slice group identity 2" to allowed S-NSSAI #2 value for future use in the context of initial access (see messaging 730).

In one embodiment, the gNB 703 maps the Slice group identities to the S-NSSAI values of the allowed network slices (i.e., Allowed NSSAI) for the UE 701. In another embodiment, the AMF 705 maps the Slice group identities to the Allowed NSSAI for the UE 701.

Step 6, the UE 701, i.e., the NAS layer, initiates signaling for S-NSSAI #2, e.g., for a URLLC service (see block 735).

Step 7, the UE 701 reads the slice-specific RACH configurations for slice 1 and slice 2 which are broadcast per SIB in the cell, and performs CBRA according to the RACH configuration for slice 2 as it matches with the configured Slice group identity 2 (see block 740).

Step 8, an RRC connection is established between the UE 701 and the gNB 703 (see block 745).

Step 9, the UE 701 sends NAS Service request message to AMF 705 including the PDU session establishment message (if a PDU Session has not been established to S-NSSAI 2 yet) or the NAS service request includes the IE PDU Session To Be Activated containing the PDU Session ID of the PDU Session of S-NSSAI 2 (see messaging 750).

Figure 8:
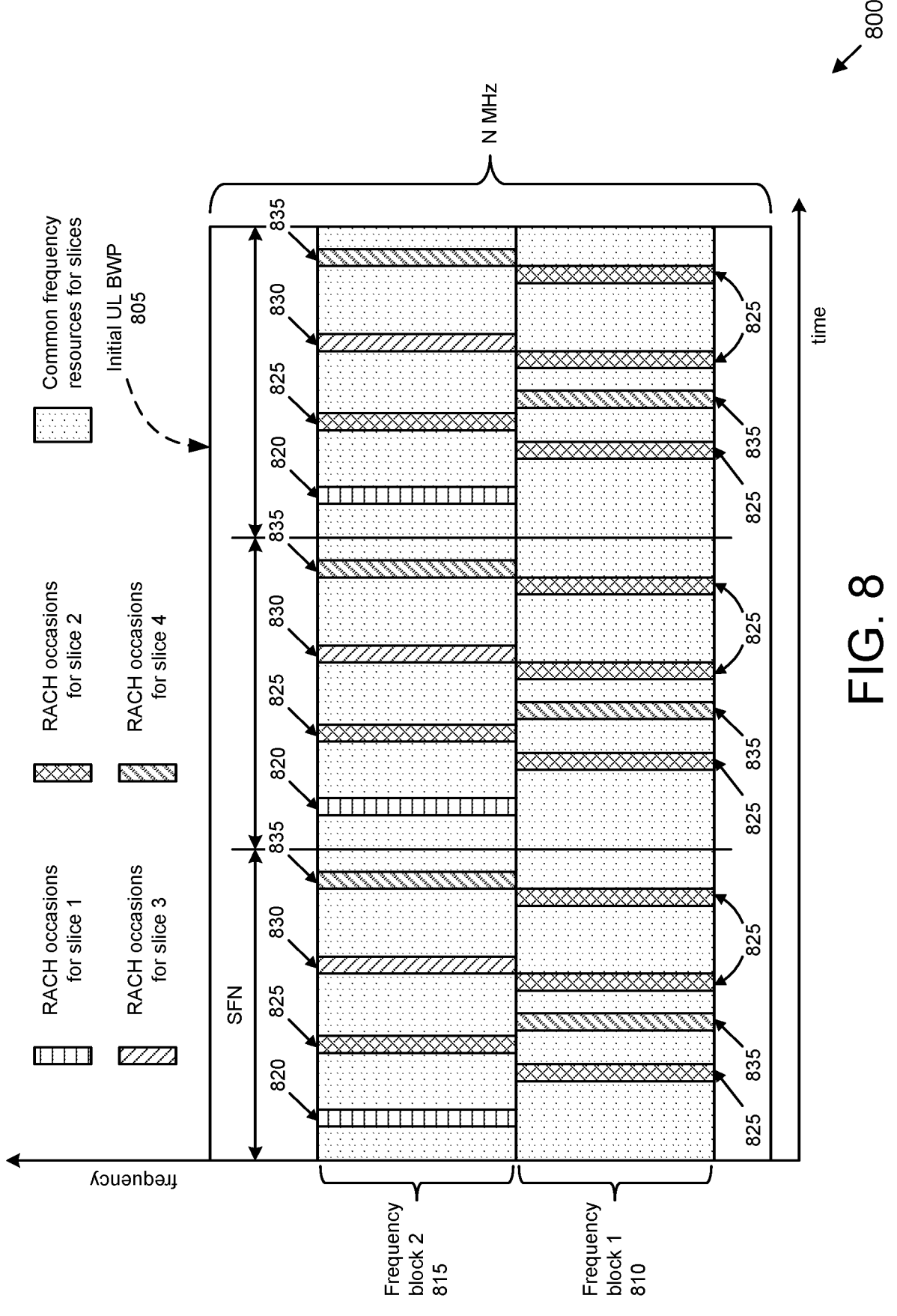
FIG. 8 is a diagram illustrating one embodiment of RACH configuration for slices with Allocation of Slice group identity value.

FIG. 8 depicts an exemplary RACH configuration 800 for slices with Allocation of Slice group identity value, according to embodiments of the disclosure. While FIG. 8 shows a RACH configuration for four network slices (i.e., Slice 1, Slice 2, Slice 3, and Slice 4), in other embodiments the RACH configuration may support greater (or fewer) numbers of network slice.

Each RACH configuration per slice shares the same resources in frequency domain, i.e., the parameters "msg1-FDM=2" and "msg1-FrequencyStart" are same for each slice. However, in time domain each RACH configuration per slice is different and separate to each other, i.e., the PRACH preambles and RACH occasions are not shared between the slices. In various embodiments, all slice-specific RACH configurations are separate from legacy RA resources (4-step and/or 2-step RA) in time/frequency.

Due to prioritization of random access the RACH configuration for Slice 2 contains the most RA resources, the RACH configuration for slice 4 contains the second most RA resources, and the RACH configurations for slice 1 and slice 3 contain the third most RA resources.

In the depicted embodiment, on the frequency block 1 810, for each system frame (i.e., identified by System Frame Number ("SFN")) there is a RACH occasion 835 for Slice 4 and three RACH occasions 825 for Slice 2. On the frequency block 2 815, for each system frame there is a RACH occasion 820 for Slice 1, a RACH occasion 825 for Slice 2, a RACH occasion 830 for Slice 3, and a RACH occasion 835 for Slice 4. Note that the frequency block 1 810 and the frequency block 2 815 also include common frequency resources for all slices.

Figure 9:
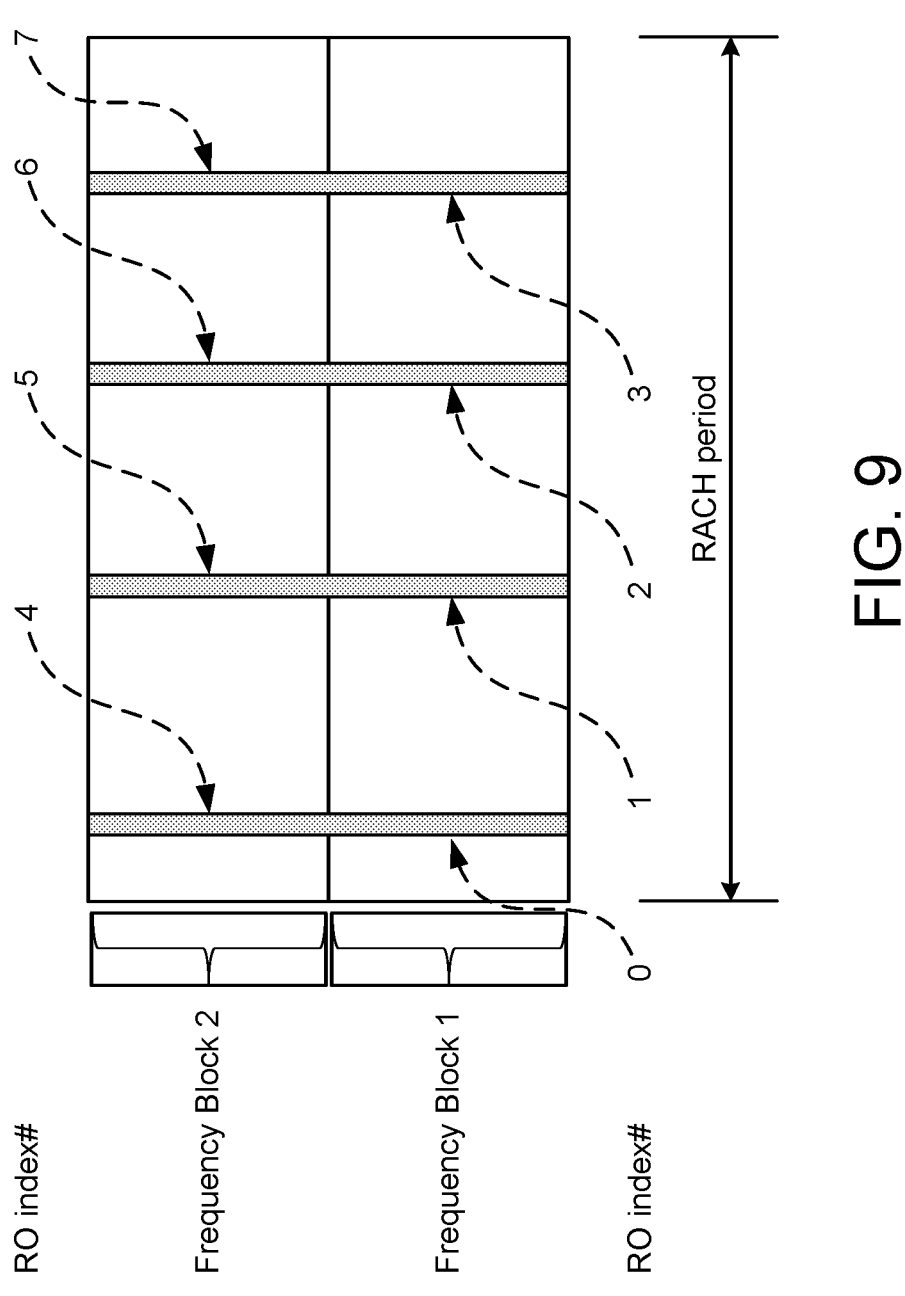
FIG. 9 is a diagram illustrating one embodiment of RACH configuration for slices with slice-specific RA resource partitioning.

FIG. 9 depicts a RACH configuration 900 for slices with slice-specific RA resource partitioning, according to embodiments of the disclosure. The RACH configuration 900 represents an alternative RACH configuration for four network slices. Each RACH configuration per slice in time/frequency is same for all slices. Two RACH frequency resources are assumed denoted with "Frequency block 1" and "Frequency block 2". The network allocates RA resources per slice in time/frequency according to Table 1 below.

Due to prioritization of random access the RACH configuration for Slice 2 contains the most RA resources, the RACH configuration for Slice 1 contains the second most RA resources, and the RACH configurations for Slice 3 and Slice 4 contain the third most RA resources.

TABLE 1

| RACH configuration for slices according to Enhancement 3 | | | | |
|---|---|---|---|---|
| Slice # | RO start index | RO offset in time/frequency | Preamble allocation | RO indices |
| Slice 1 | 0 | 0/0 | Start index = 1 End index = 16 | 0, 1, 2, 3 |

TABLE 1-continued

| | | RACH configuration for slices according to Enhancement 3 | | |
|---|---|---|---|---|
| Slice # | RO start index | RO offset in time/frequency | Preamble allocation | RO indices |
| Slice 2 | 0 | 1/1 | Start index = 17 End index = 64 | 0, 5, 2, 7 |
| Slice 3 | 1 | 1/0 | Start index = 1 End index = 32 | 1, 3 |
| Slice 4 | 4 | 2/1 | Start index = 33 End index = 64 | 4, 3 |

In certain embodiments, a UE uses a four step ("4-step") CBRA procedure to connect to a cell. As a first step, the UE sends a Physical Random Access Channel ("PRACH") preamble to the gNB. The PRACH preamble also may be referred to as "Msg1" of the RACH procedure. The gNB receives the PRACH preamble and sends a Random Access Response ("RAR"), referred to as "Msg2" of the RACH procedure. The UE listens for the RAR over a Random Access Response window (ra-Response Window). Upon receiving the RAR, the UE sends an RRC message, referred to as "Msg3" of the RACH procedure. One example of a Msg3 is an RRC Connection Request message. The RAN node sends a contention resolution message to the UE, referred to as "Msg4." Here, the Msg4 may include a Cell Radio Network Temporary Identifier ("C-RNTI") for the UE.

In other embodiments, the UE uses a two-step ("2-step") CBRA procedure to connect to a cell. This type of CBRA procedure (also called "Type-2 RA") reduces the number of interactions between the UE and network during the RRC connection setup and RRC connection resume procedures, thereby enabling a lower control plane latency. As a first step, the UE sends a Physical Random Access Channel ("PRACH") preamble to the gNB as well as PUSCH payload. The PRACH preamble+PUSCH payload may be referred to as "MsgA" of the RACH procedure. The gNB receives the PRACH preamble and PUSCH payload and sends a contention resolution message to the UE, referred to as "MsgB" of the RACH procedure.

The common RACH configuration for 2-step CBRA to be used in the initial UL BWP is signaled per broadcast in SIB1, e.g., using the IE RACH-ConfigCommonTwoStepRA-r16. In some embodiments, RA partitioning (with regards to PRACH preambles and RACH occasions) between 4-step CBRA and 2-step CBRA procedures can be configured by the network if it supports both CBRA types.

For the so-called 4-step CBRA procedure (also called "Type-1 RA"), a common RACH configuration to be used in the initial UL BWP is signaled per broadcast in SIB1 using the IE RACH-ConfigCommon. The common RA resources consist of the PRACH preambles (specific signal sequences used for random access) and RACH occasions (RO) in time/frequency domain (instances to transmit PRACH preambles). In time domain the number of RACH occasions can vary from 1 RACH occasion in every 16th radio frame up to 10 RACH occasions in every radio frame. In frequency domain 1, 2, 4 or 8 RACH occasions can be configured. There are a maximum of 64 preambles defined in each time-frequency RACH occasion and the network can apply preamble resource partitioning to differentiate the random access for following use-cases:

To address Msg3 size (Group A/B preambles): Depending on the scenario the RRC message which is transmitted by UE as message 3 during the CBRA procedure can be of different size. To distinguish the different RRC message sizes the network can allocate 2 groups of preambles associated with a Msg3 size threshold, e.g., preamble #1 to preamble #48 for Group A, and preamble #49 to preamble #64 for Group B. If the RRC message size to be transmitted is lower than the given threshold then the UE uses the preambles of Group A, otherwise the preambles of Group B.

To address System Information ("SI") request procedure (on-demand SI): If Msg1 (preambles) based SI request procedure is configured by network then it allocates a certain number of preambles which shall be used by UE solely for this procedure during the CBRA procedure.

To address Contention-Based Random-Access ("CBRA") and Contention-Free Random-Access ("CFRA") procedures: The network can allocate a certain number of preambles solely for contention-free random access. In this case the network configures a dedicated preamble to a UE for random access.

In some embodiments, the RAN 205 supports a common (i.e., shared) RACH configuration. In an example, the common RACH configuration may include two RACH occasions ("RO") in the frequency domain (given by parameter "msg1-FDM=2") from an initial UL BWP, e.g., of 20 MHz. In the time domain, each RACH occasion consists of a number of Orthogonal Frequency Division Multiplexing ("OFDM") symbols. The parameter "msg1-FrequencyStart" indicates the offset of lowest RACH occasion in frequency domain with respective to PRB 0.

Figure 10:
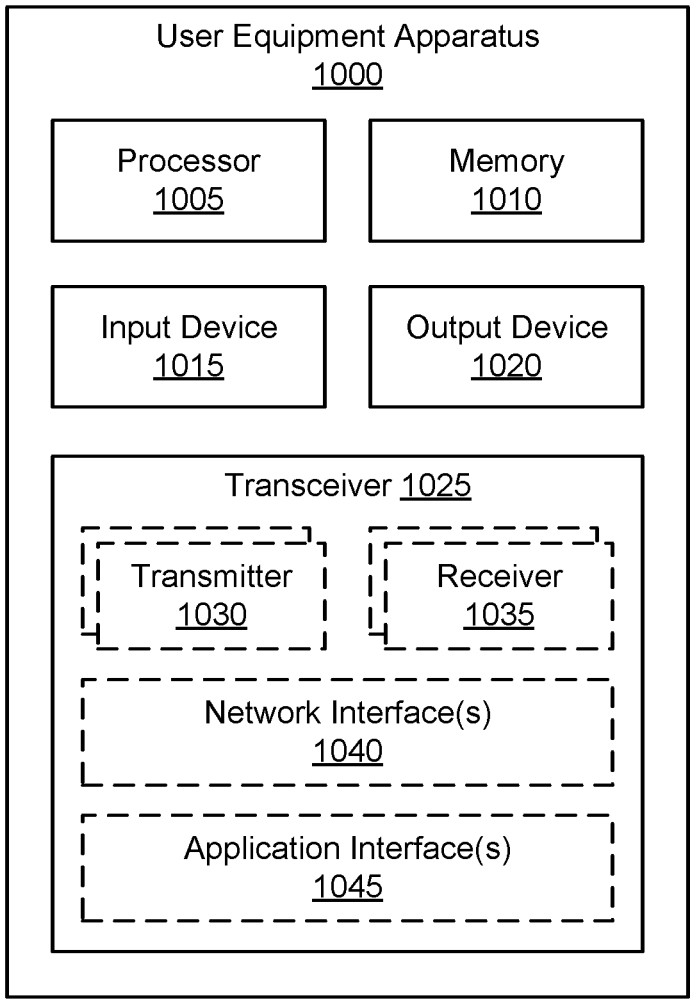
FIG. 10 is a block diagram illustrating one embodiment of a user equipment apparatus that may be used for slice-specific RACH configuration.

FIG. 10 depicts a user equipment apparatus 1000 that may be used for slice-specific RACH configuration, according to embodiments of the disclosure. In various embodiments, the user equipment apparatus 1000 is used to implement one or more of the solutions described above. The user equipment apparatus 1000 may be one embodiment of the remote unit 105, the UE #1 201, the UE #2 203, and/or the UE 701, described above. Furthermore, the user equipment apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the user equipment apparatus 1000 may not include any input device 1015 and/or output device 1020. In various embodiments, the user equipment apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. In some embodiments, the transceiver 1025 communicates with one or more cells (or wireless coverage areas) supported by one or more base units 121. In various embodiments, the transceiver 1025 is operable on unlicensed spectrum. Moreover, the transceiver 1025 may include multiple UE panels supporting one or more beams. Additionally, the transceiver 1025 may support at least one network interface 1040 and/or application interface 1045. The application interface(s) 1045 may support one or more APIs. The network interface(s) 1040 may support 3GPP reference points, such as Uu, N1, PCS, etc. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the processor 1005 controls the user equipment apparatus 1000 to implement the above described UE behaviors. In certain embodiments, the processor 1005 may include an application processor (also known as "main processor") which manages application-domain and operating system ("OS") functions and a baseband processor (also known as "baseband radio processor") which manages radio functions.

In various embodiments, the processor 1005 receives, from a communication network, a first set of slice-specific RACH configurations. Here, each slice-specific RACH configuration contains a set of random access parameters specific to a slice group identity. The processor 1005 receives, from the communication network, a mapping of slice group identities to network slices of the communication network. The processor 1005 selects, based on the mapping, a first RACH configuration for a first network slice and performs a random-access procedure in accordance with the first RACH configuration. The processor 1005 transmits a service request to the communication network in accordance with the first RACH configuration.

In some embodiments, the first set of slice-specific RACH configurations contains different levels of available random access resources in accordance with a priority of random access to each network slice. In some embodiments, the first set of slice-specific RACH configurations is provided per network slice group identity.

In some embodiments, each RACH configuration per network slice shares common (i.e., the same) frequency domain resources and has separate time domain resources. In other embodiments, each RACH configuration per network slice shares common (i.e., the same) frequency domain resources and common time domain resources.

In some embodiments, the first set of slice-specific RACH configurations is received in a System Information Block. In some embodiments, the mapping of slice group identities to network slices of the communication network is received in a dedicated RRC message. In some embodiments, the communication network includes a RAN and a plurality of PLMNs accessible via the RAN. In certain embodiments, the slice-specific RACH configurations are common to all PLMNs sharing the RAN. In other embodiments, the slice-specific RACH configurations are specific to a particular PLMN sharing the RAN.

In some embodiments, the transceiver 1025 receives an indication of a particular uplink BWP to use for the random-access procedure, where the particular uplink BWP is different from an initial uplink BWP of the UE. In such embodiments, the processor 1005 performs the random-access procedure on the particular BWP according to the first RACH configuration.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to slice-specific RACH configuration and/or mobile operation. For example, the memory 1010 may store various parameters, panel/beam configurations, resource assignments, policies, and the like as described above. In certain embodiments, the memory 1010 also stores program code and related data, such as an operating system or other controller algorithms operating on the apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1020 may include a wearable display separate from, but communicatively coupled to, the rest of the user equipment apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 communicates with one or more network functions of a mobile communication network via one or more access networks. The transceiver 1025 operates under the control of the processor 1005 to transmit messages, data, and other signals and also to receive messages, data, and other signals. For example, the processor 1005 may selectively activate the transceiver 1025 (or portions thereof) at particular times in order to send and receive messages.

The transceiver 1025 includes at least transmitter 1030 and at least one receiver 1035. One or more transmitters 1030 may be used to provide UL communication signals to a base unit 121, such as the UL transmissions described herein. Similarly, one or more receivers 1035 may be used to receive DL communication signals from the base unit 121, as described herein. Although only one transmitter 1030 and one receiver 1035 are illustrated, the user equipment apparatus 1000 may have any suitable number of transmitters 1030 and receivers 1035. Further, the transmitter(s) 1030 and the receiver(s) 1035 may be any suitable type of transmitters and receivers. In one embodiment, the transceiver 1025 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1025, transmitters 1030, and receivers 1035 may be implemented as physically separate components that access a shared hardware resource and/or software resource, such as for example, the network interface 1040.

In various embodiments, one or more transmitters 1030 and/or one or more receivers 1035 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 1030 and/or one or more receivers 1035 may be implemented and/or integrated into a multi-chip module. In some embodiments, other components such as the network interface 1040 or other hardware components/circuits may be integrated with any number of transmitters 1030 and/or receivers 1035 into a single chip. In such embodiment, the transmitters 1030 and receivers 1035 may be logically configured as a transceiver 1025 that uses one more common control signals or as modular transmitters 1030 and receivers 1035 implemented in the same hardware chip or in a multi-chip module.

Figure 11:
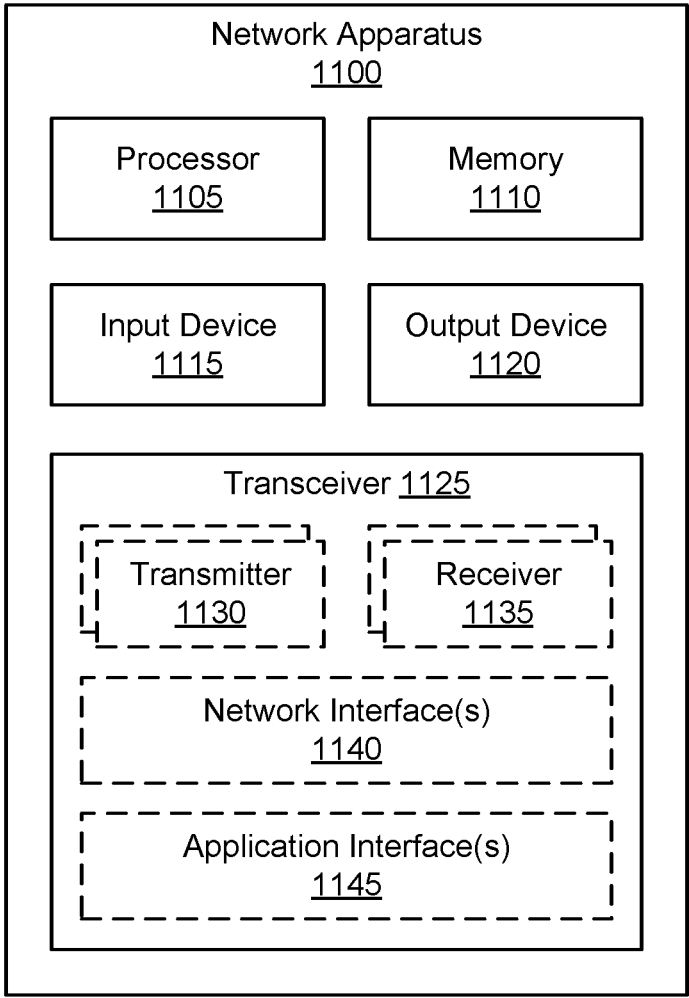
FIG. 11 is a block diagram illustrating one embodiment of a network apparatus that may be used for slice-specific RACH configuration.

FIG. 11 depicts a network apparatus 1100 that may be used for slice-specific RACH configuration, according to embodiments of the disclosure. In one embodiment, network apparatus 1100 may be one implementation of a RAN device, such as the base unit 121 and/or the gNB 703, as described above. In another embodiment, the network apparatus 1100 may be a serving network function, such as the AMF 143, the RAN 205, and/or the AMF 705, as described above. Furthermore, the network apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the network apparatus 1100 may not include any input device 1115 and/or output device 1120. In various embodiments, the network apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. Here, the transceiver 1125 communicates with one or more remote units 105. Additionally, the transceiver 1125 may support at least one network interface 1140 and/or application interface 1145. The application interface(s) 1145 may support one or more APIs. The network interface(s) 1140 may support 3GPP reference points, such as Uu, N1, N2 and N3. Other network interfaces 1140 may be supported, as understood by one of ordinary skill in the art. The processor 1105, in one embodiment, may include any known controller capable of executing computer-readable instructions and/or capable of performing logical operations. For example, the processor 1105 may be a microcontroller, a microprocessor, a CPU, a GPU, an auxiliary processing unit, a FPGA, or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the network apparatus 1100 is a RAN node (e.g., gNB) that communicates with one or more UEs, as described herein. In such embodiments, the processor 1105 controls the network apparatus 1100 to perform the above described RAN behaviors. When operating as a RAN node, the processor 1105 may include an application processor (also known as "main processor") which manages application-domain and operating system ("OS") functions and a baseband processor (also known as "baseband radio processor") which manages radio functions.

In some embodiments, the processor 1105 identifies a set of allowed network slices for a UE registered with the communication network. The processor 1105 maps slice group identities to the set of allowed network slices and configures the UE with the mapping of slice group identities to allowed network slices. Via the transceiver 1125, the processor 1105 transmits the mapping of slice group identities to network slices of the communication network to the UE and receives a message from the UE according to a RACH configuration corresponding to a slice group identity.

In some embodiments, the message received from the UE according to the RACH configuration includes a service request. In some embodiments, the processor 1105 sends (i.e., via the transceiver 1125) a first set of slice-specific RACH configurations to the UE. In such embodiments, each slice-specific RACH configuration contains a set of random access parameters specific to a slice group identity.

In certain embodiments, the first set of slice-specific RACH configurations is broadcast in a System Information Block. In certain embodiments, the first set of slice-specific RACH configurations contains different levels of available random access resources in accordance with a priority of random access to each network slice.

In certain embodiments, each RACH configuration per network slice shares common (i.e., the same) frequency domain resources and has separate time domain resources. In other embodiments, RACH configuration per network slice shares common (i.e., the same) frequency domain resources and common time domain resources.

In various embodiments, the communication network includes a RAN and a plurality of PLMNs accessible via the RAN. In certain embodiments, the slice-specific RACH configurations are common to all PLMNs sharing the RAN. In other embodiments, the slice-specific RACH configurations are specific to a particular PLMN sharing the RAN.

In some embodiments, the transceiver 1125 sends to the UE an indication of a particular uplink BWP for the UE to use for a random-access procedure, where the particular uplink BWP is different from an initial uplink BWP of the UE. In some embodiments, the first set of slice-specific RACH configurations is provided per network slice group identity.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to slice-specific RACH configuration and/or mobile operation. For example, the memory 1110 may store parameters, configurations, resource assignments, policies, and the like, as described above. In certain embodiments, the memory 1110 also stores program code and related data, such as an operating system or other controller algorithms operating on the apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the network apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 includes at least transmitter 1130 and at least one receiver 1135. One or more transmitters 1130 may be used to communicate with the UE, as described herein. Similarly, one or more receivers 1135 may be used to communicate with network functions in the Public Land Mobile Network ("PLMN") and/or RAN, as described herein. Although only one transmitter 1130 and one receiver 1135 are illustrated, the network apparatus 1100 may have any suitable number of transmitters 1130 and receivers 1135. Further, the transmitter(s) 1130 and the receiver(s) 1135 may be any suitable type of transmitters and receivers.

FIG. 12 depicts one embodiment of a method 1200 for slice-specific RACH configuration, according to embodiments of the disclosure. In various embodiments, the method 1200 is performed by a UE device, such as the remote unit 105, the UE #1 201, the UE #2 203, the UE 701, and/or the user equipment apparatus 1000, as described above. In some embodiments, the method 1200 is performed by a processor, such as a microcontroller, a microprocessor, a CPU, a GPU, an auxiliary processing unit, a FPGA, or the like.

The method 1200 begins and receives 1205, from a communication network, a first set of slice-specific RACH configurations, each slice-specific RACH configuration containing a set of random access parameters specific to a slice group identity. The method 1200 includes receiving 1210, from the communication network, a mapping of slice group identities to network slices of the communication network. The method 1200 includes selecting 1215, based on the mapping, a first RACH configuration for a first network slice. The method 1200 includes performing 1220 a random-access procedure in accordance with the first RACH configuration. The method 1200 includes transmitting 1225 a service request to the communication network in accordance with the first RACH configuration. The method 1200 ends.

FIG. 13 depicts one embodiment of a method 1300 for slice-specific RACH configuration, according to embodiments of the disclosure. In various embodiments, the method 1300 is performed by a network entity, such as the base unit 121, the AMF 143, the RAN 205, the gNB 703, the AMF 705, and/or the network apparatus 1100, as described above. In some embodiments, the method 1300 is performed by a processor, such as a microcontroller, a microprocessor, a CPU, a GPU, an auxiliary processing unit, a FPGA, or the like.

The method 1300 begins and identifies 1305 a set of allowed network slices for a user equipment ("UE") registered with the communication network. The method 1300 includes mapping 1310 slice group identities to the set of allowed network slices. The method 1300 includes configuring 1315 the UE with the mapping of slice group identities to allowed network slices. The method 1300 includes transmitting 1320 to the UE the mapping of slice group identities to network slices of the communication network. The method 1300 includes receiving 1325 a message from the UE according to a RACH configuration corresponding to a slice group identity. The method 1300 ends.

Disclosed herein is a first apparatus for slice-specific RACH configuration, according to embodiments of the disclosure. The first apparatus may be implemented by a UE device, such as the remote unit 105, the UE #1 201, the UE #2 203, the UE 701, and/or the user equipment apparatus 1000, described above. The first apparatus includes a transceiver and a processor that receives, from a communication network, a first set of slice-specific RACH configurations. Here, each slice-specific RACH configuration contains a set of random access parameters specific to a slice group identity. The processor receives, from the communication network, a mapping of slice group identities to network slices of the communication network. The processor selects, based on the mapping, a first RACH configuration for a first network slice and performs a random-access procedure in accordance with the first RACH configuration. The processor transmits a service request to the communication network in accordance with the first RACH configuration.

In some embodiments, the first set of slice-specific RACH configurations contains different levels of available random access resources in accordance with a priority of random access to each network slice. In some embodiments, the first set of slice-specific RACH configurations is provided per network slice group identity.

In some embodiments, each RACH configuration per network slice shares common (i.e., the same) frequency domain resources and has separate time domain resources. In other embodiments, each RACH configuration per network slice shares common (i.e., the same) frequency domain resources and common time domain resources.

In some embodiments, the first set of slice-specific RACH configurations is received in a System Information Block. In some embodiments, the mapping of slice group identities to network slices of the communication network is received in a dedicated RRC message.

In some embodiments, the communication network includes a RAN and a plurality of PLMNs accessible via the RAN. In certain embodiments, the slice-specific RACH configurations are common to all PLMNs sharing the RAN. In other embodiments, the slice-specific RACH configurations are specific to a particular PLMN sharing the RAN.

In some embodiments, the transceiver receives an indication of a particular uplink BWP to use for the random-access procedure, where the particular uplink BWP is different from an initial uplink BWP of the UE. In such embodiments, the processor performs the random-access procedure on the particular BWP according to the first RACH configuration.

Disclosed herein is a first method for slice-specific RACH configuration, according to embodiments of the disclosure. The first method may be performed by a UE device, such as the remote unit 105, the UE #1 201, the UE #2 203, the UE 701, and/or the user equipment apparatus 1000, described above. The first method includes receiving, from a communication network, a first set of slice-specific RACH configurations, each slice-specific RACH configuration containing a set of random access parameters specific to a slice group identity. The first method includes receiving, from the communication network, a mapping of slice group identities to network slices of the communication network and selecting, based on the mapping, a first RACH configuration for a first network slice. The first method includes performing a random-access procedure in accordance with the first RACH configuration and transmitting a service request to the communication network in accordance with the first RACH configuration.

In some embodiments, the first set of slice-specific RACH configurations contains different levels of available random access resources in accordance with a priority of random access to each network slice. In some embodiments, the first set of slice-specific RACH configurations is provided per network slice group identity.

In some embodiments, each RACH configuration per network slice shares common (i.e., the same) frequency domain resources and has separate time domain resources. In other embodiments, each RACH configuration per network slice shares common (i.e., the same) frequency domain resources and common time domain resources.

In some embodiments, the first set of slice-specific RACH configurations is received in a System Information Block. In some embodiments, the mapping of slice group identities to network slices of the communication network is received in a dedicated RRC message.

In some embodiments, the communication network includes a RAN and a plurality of PLMNs accessible via the RAN. In certain embodiments, the slice-specific RACH configurations are common to all PLMNs sharing the RAN. In other embodiments, the slice-specific RACH configurations are specific to a particular PLMN sharing the RAN.

In some embodiments, the first method includes receiving an indication of a particular uplink BWP to use for the random-access procedure, where the particular uplink BWP is different from an initial uplink BWP of the UE. In such embodiments, the first method may further include performing the random-access procedure on the particular BWP according to the first RACH configuration.

Disclosed herein is a second apparatus for slice-specific RACH configuration, according to embodiments of the disclosure. The second apparatus may be implemented by a network entity, such as the base unit 121, the AMF 143, the RAN 205, the gNB 703, the AMF 705, and/or the network apparatus 1100, described above. The second apparatus includes a transceiver and a processor that identifies a set of allowed network slices for a UE registered with the communication network. The processor maps slice group identities to the set of allowed network slices and configures the UE with the mapping of slice group identities to allowed network slices. The transceiver transmits to the UE the mapping of slice group identities to network slices of the communication network and receives a message from the UE according to a RACH configuration corresponding to a slice group identity.

In some embodiments, the message received from the UE according to the RACH configuration includes a service request. In some embodiments, the processor sends (i.e., via the transceiver) a first set of slice-specific RACH configurations to the UE. In such embodiments, each slice-specific RACH configuration contains a set of random access parameters specific to a slice group identity.

In certain embodiments, the first set of slice-specific RACH configurations is broadcast in a System Information Block. In certain embodiments, the first set of slice-specific RACH configurations contains different levels of available random access resources in accordance with a priority of random access to each network slice.

In certain embodiments, each RACH configuration per network slice shares common (i.e., the same) frequency domain resources and has separate time domain resources. In other embodiments, RACH configuration per network slice shares common (i.e., the same) frequency domain resources and common time domain resources.

In various embodiments, the communication network includes a RAN and a plurality of PLMNs accessible via the RAN. In certain embodiments, the slice-specific RACH configurations are common to all PLMNs sharing the RAN. In other embodiments, the slice-specific RACH configurations are specific to a particular PLMN sharing the RAN.

In some embodiments, the transceiver sends to the UE an indication of a particular uplink BWP for the UE to use for a random-access procedure, where the particular uplink BWP is different from an initial uplink BWP of the UE. In some embodiments, the first set of slice-specific RACH configurations is provided per network slice group identity.

Disclosed herein is a second method for slice-specific RACH configuration, according to embodiments of the disclosure. The second method may be performed by a network entity, such as the base unit 121, the AMF 143, the RAN 205, the gNB 703, the AMF 705, and/or the network apparatus 1100, described above. The second method includes identifying a set of allowed network slices for a UE registered with the communication network and mapping slice group identities to the set of allowed network slices. The second method includes configuring the UE with the mapping of slice group identities to allowed network slices and transmitting to the UE the mapping of slice group identities to network slices of the communication network. The second method includes receiving a message from the UE according to a RACH configuration corresponding to a slice group identity.

In some embodiments, the message received from the UE according to the RACH configuration includes a service request. In some embodiments, the second method includes transmitting, to the UE, a first set of slice-specific RACH configurations. In such embodiments, each slice-specific RACH configuration containing a set of random access parameters specific to a slice group identity.

In certain embodiments, the first set of slice-specific RACH configurations is broadcast in a System Information Block. In certain embodiments, the first set of slice-specific RACH configurations contains different levels of available random access resources in accordance with a priority of random access to each network slice.

In certain embodiments, each RACH configuration per network slice shares common (i.e., the same) frequency domain resources and has separate time domain resources. In other embodiments, RACH configuration per network slice shares common (i.e., the same) frequency domain resources and common time domain resources.

In various embodiments, the communication network includes a RAN and a plurality of PLMNs accessible via the RAN. In certain embodiments, the slice-specific RACH configurations are common to all PLMNs sharing the RAN. In other embodiments, the slice-specific RACH configurations are specific to a particular PLMN sharing the RAN.

In some embodiments, the second method includes transmitting an indication of a particular uplink BWP for the UE to use for a random-access procedure, where the particular uplink BWP is different from an initial uplink BWP of the UE. In some embodiments, the first set of slice-specific RACH configurations is provided per network slice group identity.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a User Equipment ("UE"), the method comprising:

receiving, from a communication network, a first set of slice-specific random access channel ("RACH") configurations, each slice-specific RACH configuration containing a set of random access parameters specific to a slice group identity;

receiving, from the communication network, a mapping of slice group identities to network slices of the communication network;

selecting, based on the mapping, a first RACH configuration for a first network slice;

performing a contention-based random-access procedure in accordance with the first RACH configuration, wherein the UE is in an RRC_IDLE state or an RRC_INACTIVE state; and transmitting, subsequent to performing the contention-based random-access procedure, a Non-Access Stratum ("NAS") service request message to request establishment of a signaling or data connection for the first network slice to the communication network in accordance with the first RACH configuration.

2. The method of claim 1, wherein the first set of slice-specific RACH configurations contains different levels of available random access resources in accordance with a priority of random access to each network slice, wherein the first set of slice-specific RACH configurations is received in a System Information Block, and wherein the mapping of slice group identities to network slices of the communication network is received in a dedicated RRC message, the method further comprising receiving an indication of a particular uplink bandwidth part ("BWP") to use for the random-access procedure, wherein the particular uplink BWP is different from an initial uplink BWP of the UE.

3. The method of claim 1, wherein each RACH configuration per network slice shares common frequency domain resources and has separate time domain resources.

4. The method of claim 1, wherein each RACH configuration per network slice shares common frequency domain resources and common time domain resources.

5. The method of claim 1, wherein the communication network comprises a Radio Access Network ("RAN") and a plurality of Public Land Mobile Networks ("PLMNs") accessible via the RAN, wherein the slice-specific RACH configurations are common to all PLMNs sharing the RAN.

6. The method of claim 1, wherein the communication network comprises a Radio Access Network ("RAN") and a plurality of Public Land Mobile Networks ("PLMNs") accessible via the RAN, wherein the slice-specific RACH configurations are specific to a particular PLMN sharing the RAN.

7. A User Equipment ("UE") apparatus, communication device of a communication network comprising:

a transceiver; and a processor that:

receives, from a communication network, a first set of slice-specific random access ("RACH") configurations, each slice-specific RACH configuration containing a set of random access parameters specific to a slice group identity;

receives, from the communication network, a mapping of slice group identities to network slices of the communication network;

selects, based on the mapping, a first RACH configuration for a first network slice;

performs a contention-based random-access procedure in accordance with the first RACH configuration, wherein the UE is in an RRC_IDLE state or an RRC_INACTIVE state; and transmits, subsequent to performing the contention-based random-access procedure, a Non-Access Stratum ("NAS") service request message to request establishment of a signaling or data connection for the first network slice to the communication network in accordance with the first RACH configuration.

8. An apparatus in a communication network, the apparatus comprising:

a processor that:

identifies a set of allowed network slices for a user equipment ("UE") registered with the communication network;

maps slice group identities to the set of allowed network slices; and configures the UE with the mapping of slice group identities to allowed network slices; and a transceiver that:

transmits to the UE the mapping of slice group identities to network slices of the communication network; and receives, from the UE subsequent to a contention-based random access procedure, a Non-Access Stratum ("NAS") service request message to request establishment of a signaling or data connection for one of the allowed network slices from the UE in accordance with a RACH configuration corresponding to a slice group identity.

9. The apparatus of claim 8, wherein the processor determines the slice group identity based on the RACH configuration used for receiving the NAS service request message and establishes the signaling or data connection for the allowed network slice corresponding to the determined slice group identity in response to receiving the NAS service request message.

10. The apparatus of claim 8, wherein the transceiver transmits, to the UE, a first set of slice-specific random access ("RACH") configurations, each slice-specific RACH configuration containing a set of random access parameters specific to a slice group identity, wherein the first set of slice-specific RACH configurations is broadcast in a System Information Block, wherein the first set of slice-specific RACH configurations contains different levels of available random access resources in accordance with a priority of random access to each network slice.

11. The apparatus of claim 10, wherein each RACH configuration per network slice shares common frequency domain resources and has separate time domain resources.

12. The apparatus of claim 10, wherein each RACH configuration per network slice shares common frequency domain resources and common time domain resources.

13. The apparatus of claim 10, wherein the communication network comprises a Radio Access Network ("RAN") and a plurality of Public Land Mobile Networks ("PLMNs") accessible via the RAN, wherein the slice-specific RACH configurations are common to all PLMNs sharing the RAN.

14. The apparatus of claim 10, wherein the communication network comprises a Radio Access Network ("RAN") and a plurality of Public Land Mobile Networks ("PLMNs") accessible via the RAN, wherein the slice-specific RACH configurations are specific to a particular PLMN sharing the RAN.

15. The apparatus of claim 8, wherein the transceiver further transmits an indication of a particular uplink bandwidth part ("BWP") for the UE to use for a random-access procedure, wherein the particular uplink BWP is different from an initial uplink BWP of the UE.

* * * * *